United States Patent [19]

Akiyama

[11] Patent Number: 4,992,864
[45] Date of Patent: Feb. 12, 1991

[54] IMAGE PROCESSOR HAVING DENSITY INDICATOR

[75] Inventor: Kazuya Akiyama, Kyoto, Japan

[73] Assignee: Dainippon Screen Mfg. Co., Ltd., Kyoto, Japan

[21] Appl. No.: 283,821

[22] Filed: Dec. 13, 1988

[30] Foreign Application Priority Data

Dec. 29, 1987 [JP] Japan .................. 62-332840

[51] Int. Cl.$^5$ .................................. H04N 1/46
[52] U.S. Cl. ........................... 358/80; 358/75
[58] Field of Search ...................... 358/80, 75

[56] References Cited

U.S. PATENT DOCUMENTS

| | | | |
|---|---|---|---|
| 4,328,515 | 5/1982 | Wellendorf | 358/80 |
| 4,393,398 | 7/1983 | Horiguchi | 358/80 |
| 4,393,399 | 7/1983 | Gast et al. | 358/80 |
| 4,414,636 | 11/1983 | Ueda et al. | 358/80 |
| 4,476,487 | 10/1984 | Klie | 358/80 |
| 4,486,772 | 12/1984 | Klie | 358/80 |
| 4,577,219 | 3/1986 | Klie | 358/80 |
| 4,689,669 | 8/1987 | Hoshino | 358/80 |
| 4,866,514 | 9/1989 | Yeomans | 358/75 |
| 4,893,181 | 1/1990 | Yeomans | 358/80 |

FOREIGN PATENT DOCUMENTS 2121645A 5/1983 United Kingdom .
2178628 1/1986 United Kingdom .

OTHER PUBLICATIONS

Color Separation Techniques, 2nd Ed., Miles Southworth, 1979, pp. 30 and 31.

Primary Examiner—Edward L. Coles, Sr.
Assistant Examiner—Jerome Grant, II
Attorney, Agent, or Firm—Lowe, Price, LeBlanc, Becker & Shur

[57] ABSTRACT

A plurality of reference points ($P_1$–$P_5$) are selected on an original image. The respective color density levels of the reference points are simultaneously displayed on the CRT (64). The operator sets up the image processor while monitoring the respective color density levels on the CRT.

24 Claims, 4 Drawing Sheets

IMAGE PROCESSOR HAVING DENSITY INDICATOR

BACKGROUND OF THE INVENTION

1. Field of the Invention

The present invention relates to an image processor having a density indicator for indicating an optical density level at a reference point on an image which is obtained by correcting an original image through an image correction such as a color correction and a tone correction.

2. Description of Prior Arts

As well known in the art, an image processor such as a process scanner is so constructed as to scan an original to separate the original image data into a plurality of color component data. Each of the color component data is corrected through a color image correction such as a color correction and a tone correction, to obtain a desirable recording image or a printed image.

Prior to the image scanning, parameters required for specifying the image correction rule are set in the process scanner according to a predetermined plane for image recording, to set up the process scanner. The setting of the parameters are usually attained in the image scanner for each original.

In the set-up process, a reference point is selected from the original image, and the respective color densities at the reference point are read with a pick up head. Signals expressing the color densities are corrected according to the image correction rule specified by the parameters, to become corrected signals expressing the corrected color densities of the reference point. The respective levels of the corrected color densities are monitored with a single density indicator in time series, whereby an operator can find whether the current values of the parameters are desired ones or not. If it is found that the current values of the parameters are improper, the control knobs are again operated until the corrected color densities have desired levels.

The conventional process scanner described above has a disadvantage in that the corrected color densities of another point whose color is identical to that of the reference point sometimes deviate from the desired ones, since the corrected color densities of only one reference point is monitored in the set-up process.

SUMMARY OF THE INVENTION

The present invention is intended for an image processor for an original image data expressing an original image.

According to the present invention, the image processor comprises (a) image data storage means for storing image data expressing respective density levels of reference points which are arbitrarily selected on the original image, (b) correction means for correcting the image data according to an image correction rule being set in the image processor through a set-up process, thereby to provide corrected image data expressing respective corrected density levels of the reference points, and (c) visual means for visually indicating the respective corrected density levels simultaneously.

In an aspect of the present invention, the visual means, described as (c) above, has an image display on which the respective corrected density levels of the reference points, described as (b) above, are displayed together with the original image.

In another aspect of the present invention, the visual means has a plurality of density indicator units for indicating the respective corrected density levels, respectively.

The present invention is also intended for a method of setting up an image processor, and the method comprises the steps of: (a) preparing an original image, (b) arbitrarily selecting a plurality of reference points on the original image, (c) obtaining density data expressing respective density levels of the reference points, (d) correcting the density data according to a predetermined image correction rule, to obtain corrected image data expressing respective corrected density levels of the reference points, (e) visually indicating the respective corrected density levels on visual means simultaneously, and (f) adjusting the image correction rule to a desired correction rule while monitoring the respective corected density levels indicated in the visual means, thereby to set up the image processor.

Accordingly, an object of the present invention is to provide an image processor whose set-up process can be conducted in a short time without errors.

Another object of the present invention is to provide a method of setting up an image processor at a high speed.

These and other objects, features, aspects and advantages of the present invention will become more apparent from the following detailed description of the present invention when taken in conjunction with the accompanying drawings.

DESCRIPTION OF PREFERRED EMBODIMENTS

Figure 1:
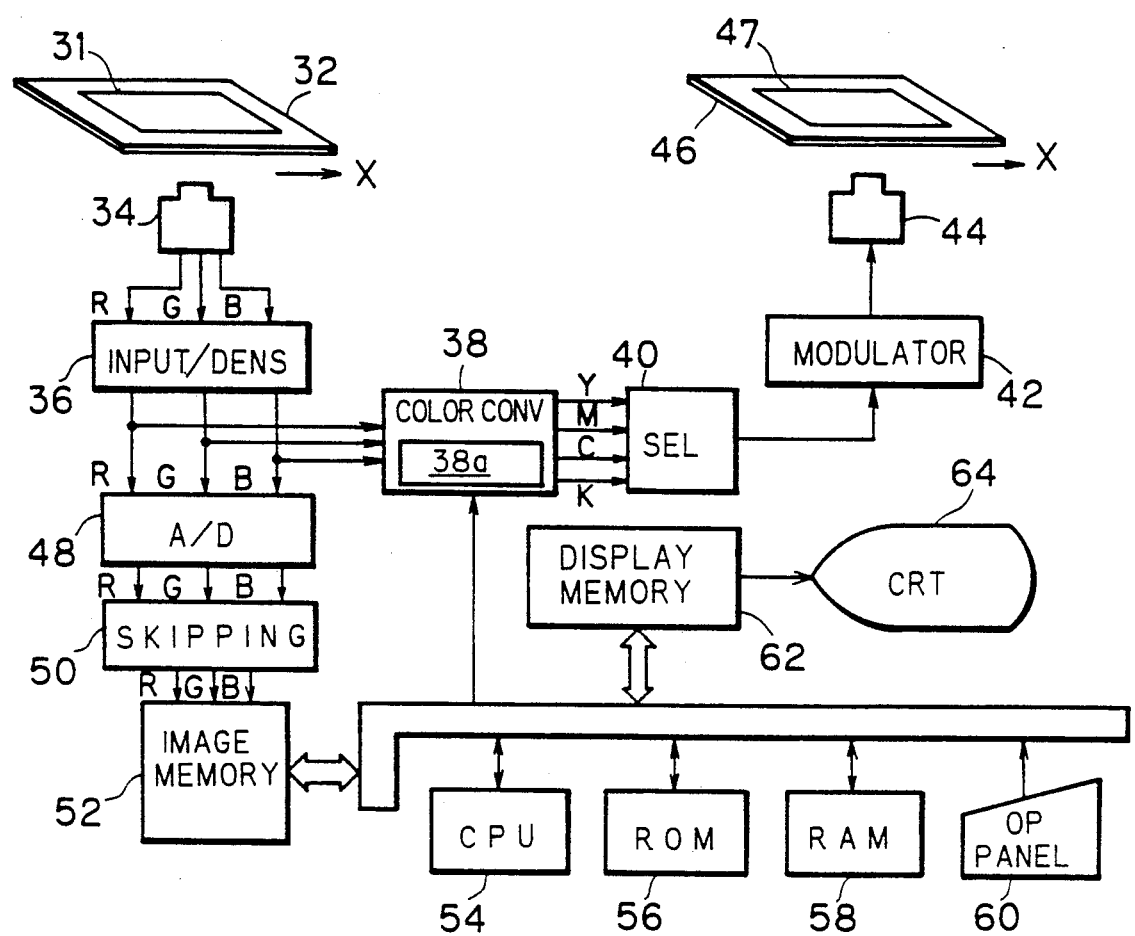
FIG. 1 is a block diagram showing a process scanner of flat bed type according to a preferred embodiment of the present invention.

FIG. 1 is a block diagram showing a process scanner of flat bed type according to a preferred embodiment of the present invention. A color original 31 is placed on a transparent table 32. A pickup head 34 having three linear image sensors is provided under the table 32, to face the original 31. The linear image sensors may be CCD linear arrays for photoelectric conversion. The table 32 and the pickup head 34 are relatively moved along the direction X, whereby the image of the original 31 is scanned with the pickup head 34. The respective color component signals for red (R), green (G) and blue (B) obtained by the pickup head 34 are transmitted to an input/density convertor 36, to be converted therein into respective color signals.

The color density signals are supplied to a color converter 38 and an A/D converter 48. The color converter 38 has a memory 38a storing a color image correction rule in the form of a look-up table, the color image correction rule being predetermined in a set-up process described later. The color density signals for R, G, B-colors are converted into the color density signals for yellow (Y), magenta (M), cyan (C) and black (K) in the color converter 38 while being subjected to the correction according to the correction rule. One of the correction color density signals is selected by a selector 40, and then delivered to a modulator 42. The modulator 42 modulates a laser beam in accordance with the corrected color density signal currently delivered thereto, and the modulated laser beam is supplied onto a color photosensitive film 47 through a recording head 44. The photosensitive film 47 is placed on a transparent table 46 being moved along the direction X, so that the photosensitive film 47 is scanned with the modulated laser beam. Through the scanning of the photosensitive film, a color separated image for Y, M, C or K-colors are recorded on the photosensitive film 47.

On the other hand, digital color density signals obtained by the A/D converter 48 are supplied to a pixel skipping circuit 50. The pixel skipping circuit 50 is operable to skip the digital color density signals at predetermined skipping rate, thereby to reduce the amount of informations expressed by the color density signals. The color density signals thus skipped are delivered to an image memory 52, and the respective color density data expressed by the color density signals are stored in the memory 52.

The color density data stored in the memory 52 are transmitted to a CPU 54, to be subjected to a color image correction according to a simulation program previously stored in a RAM 58. The corrected data are transmitted to the RAM 58, and stored therein. A program for controlling the CPU 54 and a character data for generating a character image are previously stored in a ROM 56.

An operation panel 60 is provided with control knobs used in a set-up process of the process scanner, and other manual switches. A display memory 62 is electrically coupled with the elements 52-60, and stored image data to be displayed on a CRT 64 in one-to-one correspondence between the image data and imaging positions on the CRT 64.

As will be clearly understood from the following description, the memory 52 and the CRT 64 correspond to "image data storage means" and "visual means" in the present invention, respectively, while the combination of the CPU 54, the ROM 56 and the RAM 58 corresponds to "correction means".

Figure 2:
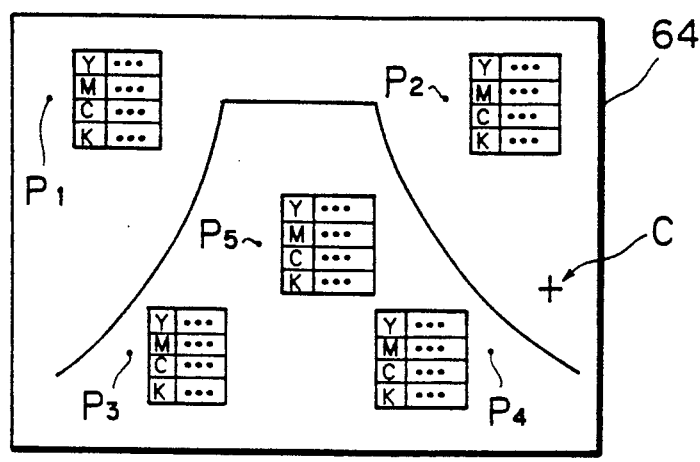
FIG. 2 is an image view being displayed on a CRT employed in the preferred embodiment.

The set-up process of the process scanner is conducted as follows: First, the original 31 placed on the table 32 is scanned with the pickup head 34, whereby the respective color component signals for R, G, B-color are obtained. The color component signals are converted to color density data, and then stored in the image memory 52. The color density data stored in the image memory 52 are accessed and transmitted to the CRT 64 through the display memory 62, whereby the original image is displayed on the CRT 64 together with a cursor image C, as shown in FIG. 2.

Then, the control knob provided in the operation panel 60 is manually operated, thereby to move the cursor C to a desired position on the CRT 64. When an enter-key provided in the operation panel 60 is operated, the current position of the cursor C is detected and fetched into the CPU 54, whereby a reference point on the original image is specified. Through repetition of the above indicated steps, a plurality of reference points $P_1$ through $P_5$, for example, are selected and indicated on the original image being displayed.

When the selection is completed, the respective color density data for the reference points are read out from the image memory 52. The CPU 54 corrects the respective color density data according to the simulation program previously stored in the RAM 58, for each reference point. The corrected color density data for Y, M, C and K-colors with respect to each reference point are stored in the RAM 58.

The corrected color density data are read out from the RAM 58, and transmitted to the CRT 64 through the display memory 62, whereby the respective density levels of the reference points expressed by the corrected density data are simultaneously displayed at the neighborhood of the respective corresponding reference points on the CRT 64. Preferably, the density levels for Y, M, C and K-colors are displayed in the form of a table, as shown in FIG. 2.

The operator then operates the control knobs to change the image correction rule to a desired one, while monitoring the density values on the CRT 64. In response to the operation, the density levels corresponding to the new correction rule are calculated by the CPU 54 according to the simulation program. The new density levels thus obtained are simultaneously displayed on the CRT 64 in place of the their old levels. When all of the respective density levels for the reference points $P_1$ through $P_5$ are set at the desired levels, the operator operates the enter-key. A data expressing the image correction rule is transmitted to the memory 38a, to be stored therein in the form of a correction table. The set-up process is now completed.

After the set-up process, the original 31 is scanned again with the pickup head 34. The color component signals thus obtained are converted to color density signals through the input/density coverter 36.

The color density signals are converted into those for Y, M, C and K-color by the color converter 38 while being subjected to the correction according to the correction table. One of the corrected color density signals is selected by the selector 40, to be delivered to the modulator 42. The scanning of the photosensitive film 47 exposure is conducted, whereby a color component image is recorded on the photosensitive film 47.

Figure 3:
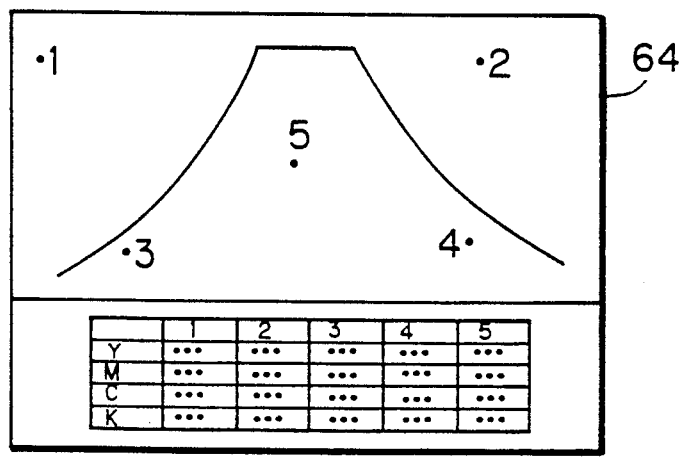
FIG. 3 is another image view displayed on the CRT.

In the set-up process indicated above, the respective density levels of the reference points $P_1$ through $P_5$ may be simultaneously displayed at a predetermined area of the display plane of the CRT 64, as shown in FIG. 3. In this case, the respective positions of the reference points are displayed with numeral images of "1" through "5", while the density levels are displayed at the bottom area of the display plane with the corresponding numeral images, for example. Alternatively, the respective density levels for the reference points may be displayed in the form of a graph. Furthermore, it is also possible to display the original image on one CRT, while the density levels are displayed on another CRT.

Figure 4:
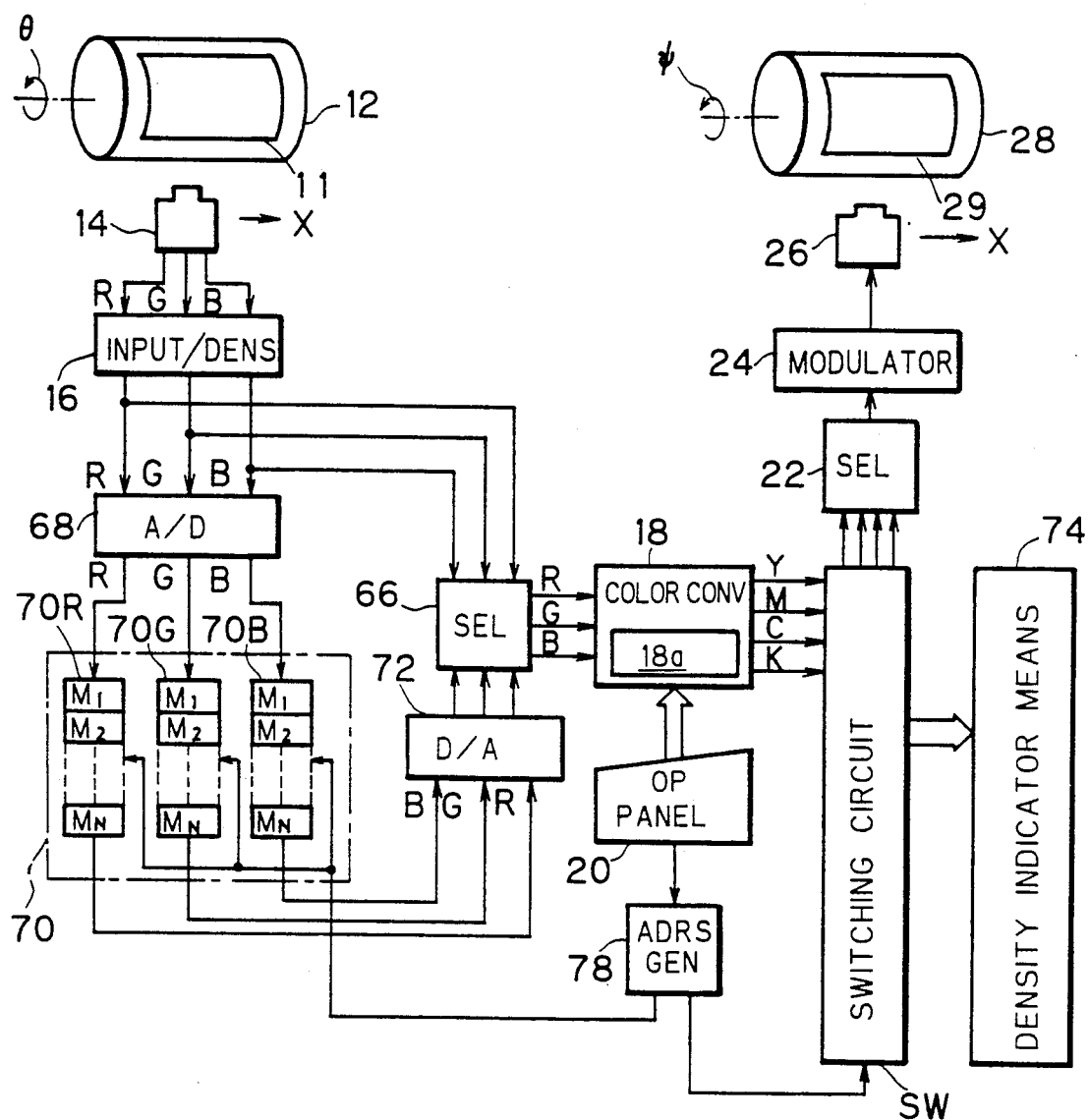
FIG. 4 is a block diagram showing a process scanner of drum type according to another preferred embodiment of the present invention.

FIG. 4 is a block diagram showing a drum type process scanner according to another preferred embodiment of the present invention. An original 11 wound around an original drum 12 is rotated with the original drum 12 in the direction $\theta$. A pickup head 14 is relatively moved along the direction X, while reading the original image. Color component signals for R, G and B-colors are converted into respective density signals by an input/density converter 16. The color density signals are further converted into digital signals through an A/D converter 68, and the respective color density levels expressed by the digital color density signals are stored in an image memory 70, which corresponds to "image data storage means" in the present invention. The image memory 70 has a plurality of memories 70R, 70G and 70B in which the color density data for R, G and B-colors are stored, respectively. As will be understood later, since only the color density data for reference points, whose number is N being larger than one, are stored in each memory, each of the memories 70R, 70G and 70B has storage areas $M_1$ through $M_N$ for the respective reference points.

Figure 5:
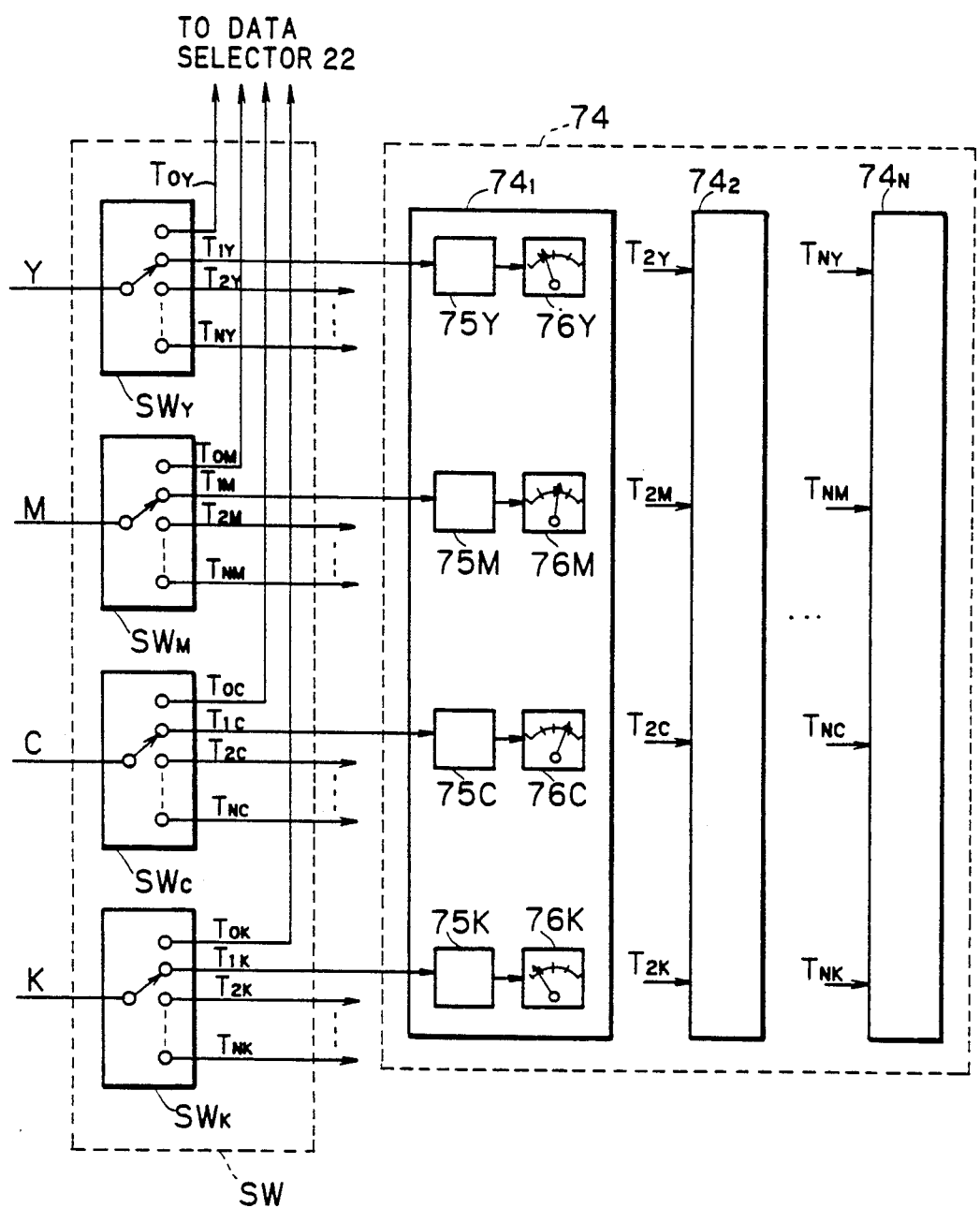
FIG. 5 is a block diagram showing switching circuits and density indicators employed in the process scanner shown in FIG. 4.

The color density data read out from the image memory 70 are supplied to a color converter 18 through a D/A converter 72 and a selector 66. The color converter 18 has a memory 18a in which a color image correction table is stored through a set-up process. The color density data are converted into those for Y, M, C and K-colors while being subjected to the image correction according to the correction table, and the converted data are delivered to a switching circuit SW. As shown in FIG. 5, the switching circuit SW comprises respective switches or demultiplexers $SW_Y$, $SW_M$, $SW_C$, and $SW_K$ for Y, M, C and K-colors. Each of the switches $SW_Y$-$SW_K$ has an output terminal $T_{0Y}$, $T_{0M}$, $T_{0C}$ or $T_{0K}$ connected to a data selector 22 (FIG. 4) and other terminals $T_{1Y}$-$T_{NY}$, $T_{1M}$-$T_{NM}$, $T_{1C}$-$T_{NC}$ or $T_{1K}$-$T_{NK}$ connected to density indicator units $74_1$-$74_N$, respectively, the density indicator units $74_1$-$74_N$ being provided in a density indicator means 74.

The density indicator units $74_1$-$74_N$ correspond to a plurality of reference points, respectively, and are operable to simultaneously indicate the respective density levels of Y., M, C and K-colors with respect to the reference points. More particularly, each of the density indicator units $74_1$-$74_N$ has latch circuits 75Y-75K for latching the color density signals of Y, M, C and K-colors supplied from the switching circuit SW, and density meters 76Y-76K connected to the latch circuit 75Y-75K and operable to indicate the color density levels, respectively.

Referring to FIG. 4, the process scanner further comprises an operation panel 20 having control knobs, and an address generator 78 for generating address signals. The address signal is used for selecting one of the storage areas $M_1$-$M_N$ i each of the memories 70R, 70G and 70B, and selecting one of the output terminals in each of the switches $SW_Y$-$SW_K$. A selector 22, a modulator 24 and a recording head 26 are provided in the process scanner, similarly to that shown in FIG. 1. A photosensitive film 29 wound around a recording drum 28 is rotated in the direction $\phi$ with the recording drum 28, and a color separated image is recorded on the photosensitive film 29 in a recording process.

In the set-up process, each of the respective input terminal of the switches $SW_Y$-$SW_K$ is electrically connected to the output terminal $T_{1Y}$ ($T_{1M}$, $T_{1C}$, $T_{1K}$), whereby the signal path from the color converter 18 to the density indicator $74_1$ is established. At the same time, the data selector or multiplexer 66 selects its input signals supplied from the D/A converter 72. The original drum 12 and the pickup head 14 are manually rotated and moved, respectively, and they are stopped when a first reference point arbitrarily selected in the original image comes to a position facing the pickup head 14. Then, an operator operates an enter-key provided in the operation panel 20, so that color image light respecting the first reference point is fetched to the pickup head 14. The color density signals obtained through the input/density converter 16 is supplied to the image memory 70 through the A/D converter 68. In the image memory 70, the respective first storage areas $M_1$ are selected by the address signal supplied from the address generator 78, so that the color density data for respective colors are stored in the respective first storage areas $M_1$.

The designation and the storage operation are repeated for other reference points while serially selecting the storage areas $M_2$-$M_N$, so that the respective color density data for second through N-th reference points are stored in the storage regions $M_2$-$M_N$ for each color, respectively.

When the storage operation is completed, the control knobs provided in the operation panel 20 are manually operated, thereby to set a desired image correction rule in the memory 18a as a color image correction table. Then, the address generator 78 generates an address signal for scanning the respective addresses of the storage areas $M_1$-$M_N$ in series, and the respective color density data for the first through N-th reference points are read out from the memories 70R, 70G and 70B. The respective color density data are supplied to the color converter 18 through the D/A converter 72 and the data selector 66, and are converted into the color density signals for Y, M, C and K-colors while subjected to the image correction according to the correction table. The corrected color density signals for Y, M, C and K-colors thus obtained are delivered to the switching circuit SW.

Each of the switches $SW_Y$-$SW_K$ serially selects output terminals along the order of $T_{1Y}$-$T_{NY}$ ($T_{1M}$-$T_{NM}$, $T_{1C}$-$T_{NC}$, $T_{1K}$-$T_{NK}$) under the control with the address signal. Since the address signal generated in the address generator 78 is used in common to the image memory 70 and the switching circuit SW, the serial read-out operation in the image memory 70 is synchronized with the serial selection of the output terminals in the switching circuit SW, whereby the respective corrected color density data respecting the first through the N-th reference points are delivered to the density indicator units $74_1$-$74_N$, respectively. Accordingly, the respective color density levels of Y, M, C and K-colors respecting the first through N-th reference points are latched by the latch circuits 75Y-75K and simultaneously indicated at the density meters 76Y-76K of the density indicator units $74_1$-$74_N$, respectively.

The operator then operates the control knobs again while monitoring the respective color density levels of the first through N-th reference points indicated in the respective density meters 76Y-76K of the density indicator units $74_1$-$74_N$, thereby to try to adjust the correction rule to the desired one. The new correction rule thus obtained is stored in the memory 18a in place of the old correction rule, and the above indicated process is repeated until the desired density levels are indicated in the respective density meters 76Y-76K. When the desired density levels are obtained the set-up process is completed.

After the set-up process, the data selector 66 is switched to be electrically connected to the input/density converter 16, while the switching circuit selects the output terminals $T_{0Y}$-$T_{0K}$. The original 11 is scanned with the pickup head 14, whereby color component signals representing the original image are obtained. The color component signals are converted into color density signals and delivered to the color converter 18 through the selector 66. The color density signals for R, G, B-colors are converted into the color density signals for Y, M, C and K-colors in the color converter 18 while being subjected to the color image correction according to the correction table stored in the memory 18a. The corrected color density signals are transmitted to the data selector 22 through the switching circuit SW, and one of them is selected to be delivered to the modulator 24. The photosensitive film 29 is scanned by the modulated laser beam emitted from the recording head 26, whereby a color component image is recorded on the photosensitive film 24.

According to the present invention, at least two sets of density indicators are required for simultaneously displaying the respective density levels of a plurality of reference points. When the number of the reference points exceeds that of the density indicator units, the respective levels may be indicated on the density indicators in series. If density meters operable to hold the respective color density data such as peak meters are employed, the latch circuits 75Y-75K may be omitted. The density display means may be displays other than those employed in the preferred embodiments.

The present invention can be also applied to a process scanner for recording four color component images of Y, M, C and K-colors through one scanning of the photosensitive film, a monochromatic process scanner, and the like. The original image data may be supplied from a disc memory, a TV camera, a graphic computer, or other input devices.

As understood from the above description, since the respective density levels of reference points are simultaneously indicated or displayed on the density display means in the set-up process, the set-up process can be carried out while simultaneously monitoring the respective density levels, so that an image processor such as a process scanner can be set up in a short time without errors.

Although the present invention has been described and illustrated in detail, it is clearly understood that the same is by way of illustration and example only and is not to be taken by way of limitation, the spirit and scope of the present invention being limited only by the terms of the appended claims.

I claim:

1. An image processor for reproducing an original image, comprising:
   (a) image data storage means for storing image data representing the original image,
   (b) correction means for correcting the entirety of said image data according to an image correction rule being set in said image processor through a set-up process,
   (c) selection means for arbitrarily selecting corrected image data representing a plurality of reference points,
   (d) visual means for visually indicating respective corrected density levels of said reference points simultaneously,
   (e) adjusting means for selectively changing said density levels, and
   (f) resetting means for resetting said image correction rule in response to the changed reference point density levels.

2. An image processor in accordance with claim 1, wherein
   said visual means has an image display on which said respective corrected density levels are displayed together with a display of said original image.

3. An image processor in accordance with claim 2, wherein:
   said respective corrected density values are displayed at respective neighborhoods of said reference points on said image display.

4. An image processor in accordance with claim 2, wherein:
   said respective corrected density levels are displayed on a predetermined area of said image display, and reference symbols corresponding to said reference points are displayed at respective neighborhoods of said reference points on said image display.

5. An image processor in accordance with claim 1, wherein:
   said visual means has a plurality of density indicator units for indicating said respective corrected density levels, respectively.

6. An image processor in accordance with claim 5, wherein:
   said image processor is a color image processor, and each of said indicator units has a plurality of density indicators corresponding to color components included in said corrected image data, respectively.

7. An image processor in accordance with claim 6, wherein:
   each of said density indicators has a density meter.

8. A method of setting up an image processor, comprising the steps of:
   (a) preparing an original image,
   (b) applying a predetermined image correction rule to obtain corrected image data for the entire image area,
   (c) arbitrarily selecting a plurality of reference points on said original image,
   (d) obtaining density data representing respective corrected density levels of said reference points,
   (e) simultaneously indicating said respective corrected density levels on visual means,
   (f) selectively changing said respective corrected density levels, and
   (g) adjusting said image correction rule to a desired correction rule in response to the changed levels while monitoring said respective corrected density levels indicated in said visual means, thereby setting up said image processor.

9. A method in accordance with claim 8, wherein the step (b) includes the steps of:
   (b-1) displaying said original image on said image display, and
   (b-2) serially designating said reference points on said original image displayed on said image display with a cursor.

10. A method in accordance with claim 9, wherein the step (e) includes the step of:
    (e-1) displaying said respective corrected density levels together with said original image.

11. A method in accordance with claim 10, wherein said respective corrected density levels are displayed at respective neighborhoods of said reference points.

12. A method in accordance with claim 8, wherein the step (e) includes the step of:
    (e-2) indicating said respective corrected density levels with a plurality of density indicators, respectively.

13. An image processor for reproducing an original image, comprising:
    (a) data storage means for storing reference image data representing respective density levels of reference points which are arbitrarily selected on said original image, (b) correction means for correcting either of said reference image data and the entirety of image data of said original image according to an image correction rule being set in said image processor through a set-up process, (c) visual means for visually indicating respective corrected density levels of said reference points corrected by said correction means, simultaneously, and (d) resetting means for resetting said image correction rule.

14. An image processor in accordance with claim 13, wherein:

said visual means has an image display on which said respective corrected density levels are displayed together with a display of said original image.

15. An image processor in accordance with claim 14, wherein:

said respective corrected density values are displayed at respective neighborhoods of said reference points on said image display.

16. An image processor in accordance with claim 14, wherein:

said respective corrected density levels are displayed on a predetermined area of said image display together with respective reference symbols, and said reference symbols are displayed also at respective neighborhoods of said reference points in said image display.

17. An image processor in accordance with claim 13, wherein:

said visual means has a plurality of density indicator units for indicating said respective corrected density levels, respectively.

18. An image processor in accordance with claim 17, wherein:

said image processor is a color image processor, and each of said indicator units has a plurality of density indicators corresponding to color components included in said corrected image data, respectively.

19. An image processor in accordance with claim 18, wherein:

each of said density indicators has a density meter.

20. A method of correcting image data, comprising the steps of:

(a) preparing an original image, (b) arbitrarily selecting a plurality of reference points on said original image, (c) obtaining reference image data representing respective density levels of said reference points, (d) correcting said reference image data according to a predetermined image correction rule, to obtain corrected image data expressing respective corrected density levels of said reference points, (e) visually indicating said respective corrected density levels of said reference points on visual means, simultaneously, (f) adjusting said image correction rule to a desired correction rule while monitoring said respective corrected density levels indicated in said visual means, and (g) correcting the entirety of image data of said original image according to said desired correction rule.

21. A method in accordance with claim 20, wherein the step (b) includes the steps of:

(b-1) displaying said original image on said image display, and (b-2) serially designating said reference points on said original image displayed on said image display with a cursor.

22. A method in accordance with claim 21, wherein the step (e) includes the step of:

(e-1) displaying said respective corrected density levels together with said original image.

23. A method in accordance with claim 22, wherein:

said respective corrected density levels are displayed at respective neighborhoods of said reference points.

24. A method in accordance with claim 20, wherein the step (e) includes the step of:

(e-2) indicating said respective corrected density levels with a plurality of density indicators, respectively.

* * * * *